United States Patent [19]

Jenkins et al.

[11] 4,252,930

[45] Feb. 24, 1981

[54] POLYMERIZATION CATALYST COMPOSITION

[76] Inventors: Derek K. Jenkins, 7 Lakewood Rd., Ashurst, Southampton; Anthony V. Butcher, 8 Pine Close, Barton-on-Sea, New Milton, Hampshire; Donald G. Timms, 9 Gaza Ave., East Boldre, Brockenhurst, Hampshire, all of England

[21] Appl. No.: 671,963

[22] Filed: Mar. 30, 1976

Related U.S. Application Data

[63] Continuation-in-part of Ser. No. 439,824, Feb. 5, 1974, abandoned.

[30] Foreign Application Priority Data

Feb. 14, 1973 [GB] United Kingdom .................. 7259/73
Dec. 13, 1973 [GB] United Kingdom ............... 57767/73

[51] Int. Cl.³ .......................... C08F 4/66; C08F 10/06
[52] U.S. Cl. ................................. 526/137; 252/429 B; 526/139; 526/153; 526/351
[58] Field of Search .................. 252/429 B; 526/137, 526/139

[56] References Cited

U.S. PATENT DOCUMENTS

| 3,534,006 | 10/1970 | Kamaishi et al. | 526/141 |
| 3,825,524 | 7/1974 | Wada et al. | 526/141 |
| 3,850,899 | 11/1974 | Wada et al. | 526/141 |

FOREIGN PATENT DOCUMENTS

| 2407095 | 9/1974 | Fed. Rep. of Germany . |
| 921954 | 3/1963 | United Kingdom . |
| 1017977 | 1/1966 | United Kingdom . |

*Primary Examiner*—Edward J. Smith
*Attorney, Agent, or Firm*—Cushman, Darby & Cushman

[57] ABSTRACT

Titanium trichloride for use as a component of a Ziegler polymerization catalyst is modified in order to enhance the activity and/or stereospecificity of the catalyst in the polymerization of olefins, especially propylene, by heating the titanium trichloride with phosphorus oxytrichloride in an aromatic hydrocarbon diluent for several hours in the absence of the organo aluminium component of the catalyst. Ball milling, or shearing, during the modification reaction is not required. The use of aromatic hydrocarbon gives unexpected improvement compared with any other hydrocarbon diluent and the modification reaction gives improved results compared with addition of the titanium trichloride, phosphorus oxytrichloride and the organo aluminium component to the reactor at the beginning of a batch polymerization.

20 Claims, No Drawings

POLYMERIZATION CATALYST COMPOSITION

This application is a continuation-in-part of application Ser. No. 439,824 filed Feb. 5, 1974 and now abandoned.

This invention relates to a Ziegler polymerisation catalyst composition comprising a titanium trichloride and to a process for the modification of the titanium trichloride component of such a catalyst.

It is well known that titanium trihalides are capable of polymerising a variety of olefins, especially aliphatic alpha olefins, when used in conjunction with an aluminium alkyl or aluminium alkyl halide, as in the so called Ziegler catalysts. Of the titanium trihalides, violet titanium trichloide is the most common and is particularly active in such polymerisations. Violet titanium trichloride exists in three forms, $\alpha TiCl_3$, $\gamma TiCl_3$, and $\delta TiCl_3$ depending on the method of reduction of $TiCl_4$ which is used in the preparation. Hydrogen, aluminium and aluminium alkyls are typical reductants. Aluminium and aluminium alkyl reduction of $TiCl_4$ gives a cocrystallised product of formula $_nTiCl_3.AlCl_3$, commonly $3TiCl_3.AlCl_3$, depending on the conditions used. $3TiCl_3.AlCl_3$ is particularly effective in the polymerisation of olefins and especially when activated by grinding before use to give the so called delta titanium trichloride.

In the polymerisation of olefins having 3 or more carbon atoms, high yields of isotactic polymer are particularly desirable. Therefore much work has been carried out to increase the yield and/or isotactic content of the product. Various methods have been attempted. For example an increase in the isotactic content of polypropylene is obtained using the titanium trichloride cocrystallised with aluminium chloride, referred to above, in combination with aluminium triethyl instead of using $TiCl_3$ as the titanium component. An increase in isotacticity is also obtained using an aluminium dialkyl halide in place of the aluminium alkyl as the aluminium component of the catalyst, but the yield of polymer is quite seriously decreased.

Generally a catalyst of an aluminium alkyl dihalide and titanium trichloride yields little or no polymer and any polymer obtained is oily and non crystalline. Aluminium alkyl dihalides are therefore generally considered to be inactive in such polymerisations unless a third component is present. For example U.K. Pat. No. 997,327 discloses the activation of a catalyst comprising an organo aluminium dihalide or sesquihalide (i.e., having a halogen to organo ratio of 1 or more:1) by addition of a phosphoryl halide or organo phosphoryl halide to the mixture.

An increase in the yield and/or polymer isotactic content can also be obtained using the above two component catalyst systems by the addition of various compounds to the polymerisation system and numerous compounds are claimed to be effective to a greater or lesser degree. Thus Dutch Patent Application No. 7209681 discloses an alkene polymerisation catalyst which consists of a mixture of (1) a titanium trichloride, (2) an organo aluminium compound and (3) a trivalent phosphorus compound of formula $PB_{(3-n)}(X-A-Y)_n$ where B is halogen, hydrocarbyl or preferably $NR_2$ or OR; R is hydrocarbyl preferably methyl or ethyl; X is O, S or NR; A is a divalent organic group such that X and Y are separated by at most 3 carbon atoms; Y is OR, $NR_2$, $PR_2$ or a heterocyclic ring system; and n is 1, 2 or 3. An example of a suitable compound is $P[OCH_2CH_2N(CH_3)_2]_3$. The catalyst is claimed to give high yields of polymer with a low content of soluble material. Similarly U.K. Pat. No. 1,122,010 discloses the polymerisation of alpha olefins in the presence of a catalytic amount of a catalyst composition obtained by mixing together (1) a halide or oxyhalide of a transition metal of Groups IVA to IVA of the Periodic Table; (2) an organoaluminium compound of formula $R_4Al_2SO_4$ where R is independently a hydrocarbon radical of 1 to 15 carbon atoms; and (3) one or more compounds selected from (i) $PX_3$ or $POX_3$, (ii) $SOX_2$ or $SO_2X_2$, (iii) $R^1R^2R^3P$ or $(R^1R^2N_3)PO$ in which X is halogen and $R^1$, $R^2$ and $R^3$ are alkyl groups, amongst a number of other compounds. The catalyst components are added to the reactor and polymerisation begins on addition of the alpha olefin.

U.S. Pat. Nos. 2,972,607; 2,969,345; 2,969,346 and 3,081,287 disclose the use of such compounds as triphenyl phosphine, triethyl phosphate triethyl phosphite and tris N,N-dimethyl phosphoramide added to the reactor in the polymerisation of olefins using aluminium or an aluminium alkyl dihalide as the aluminium component. In U.K. Pat. Nos. 1,234,657 and 1,239,589 there are disclosed catalyst systems of a titanium (III) halide-aluminium halide complex and an organo aluminium compound which have been modified with one or more phosphorus compounds of general formula $PR_1R_2R_3$, $POR_1R_2R_3$ or $POR_1R_2-POR_3R_4$ in which $R_1$, $R_2$, $R_3$ and $R_4$ denote hydrogen atoms or identical or different alkyl, aralkyl, aryl, alkylamino aralkylamino or arylamino groups. The modification is carried out by grinding 1 to 50% of the total weight of phosphorus compound with the titanium (III) complex and then introducing the remainder of the total weight of phosphorus compound into the catalyst system without grinding.

In U.K. Pat. No. 921,934 the preparation of a modified Ziegler catalyst is described comprising the addition to a Ziegler catalyst of one or more compounds of the general formula $AR_3$ or $AR'_3X_2$ in which A denotes nitrogen, phosphorus, arsenic, antimony or bismuth, R denotes hydroxyalkyl, hydroxyaryl or halogen, R' denotes hydrogen, alkyl, aryl, aralkyl, cycloalkyl, hydroxyalkyl, hydroxyaryl or halogen, X (monovalent) denotes halogen, aryl, alkyl, aralkyl or cycloalkyl or $X_2$ (divalent) denotes oxygen, sulphur, selenium, tellurium or =NH, compounds of the type $AR_3$ having three halogen atoms being excluded.

A wide variety of suitable compounds is disclosed in the specification of U.K. Pat. No. 921,954 including phosphorus oxyhalides, such as phosphorus oxychloride. The polymerisation catalyst may be prepared by mixing the compounds of a metal of groups IVB, VB, VLB or VIII, for example titanium chloride, in the presence or in the absence of the organo-metallic compound, for example aluminium triethyl, if desired in the presence of an inert organic solvent, with the additional component, for example by grinding in a mill. The additional compound may also be allowed to act in solution or in the gas phase on the organo-metallic compound and/or the other metal compound and the resultant heterogeneous catalyst be additionally subjected to a heat treatment. In the Examples of the said U.K. Patent the components are reacted by milling in a ball mill.

We find that significant improvements in the activity and stereospecificity of the resultant catalyst may be obtained simply by heating phosphorus oxytrichloride with titanium trichloride provided that an aromatic hydrocarbon diluent is used. Ball milling of the components is unnecessary and in fact liquid phase ball milling (slurry grinding) has a deleterious effect on isotacticity and/or yield.

According to the present invention a process for the preparation of a modified titanium trichloride component of a Ziegler catalyst comprises reacting the titanium trichloride with phosphorus oxytrichloride, the reaction being carried out by heating the compounds in an aromatic hydrocarbon diluent for several hours in the absence of the organo aluminium component. In the simplest embodiment the titanium trichloride and phosphorus oxytrichloride are boiled in the aromatic hydrocarbon. However, it is preferred that a temperature of 60° C. to 100° C. is used.

The invention also includes a process for the preparation of an olefin polymerisation catalyst composition which comprises adding an organo aluminium cocatalyst to titanium trichloride modified as just defined and the olefin polymerisation catalyst composition so produced. The invention further includes a process for the polymerisation of one or more olefins in the presence of such an olefin polymerisation catalyst composition.

The amount of phosphorus oxytrichloride used is preferably such that the atomic ratio of titanium to phosphorus is in the range 2:1 to 100:1, (i.e., P:Ti of 0.01:1 to 0.5:1), more preferably 2:1 to 20:1. Excess phosphorus oxytrichloride is detrimental since a different (green) species of greatly reduced activity and stereospecificity is formed and such excess should be avoided. The maximum amount of phosphorus oxytrichloride which may be used is, however, only limited by the effect on catalytic activity. The upper limit is therefore less than that required to destroy catalytic activity.

The modification reaction is carried out in the liquid phase using an aromatic hydrocarbon, preferably benzene or toluene, as diluent. Surprisingly, other diluents such as aliphatic hydrocarbons give an inferior result. The reaction is carried out by heating the components in the aromatic hydrocarbon for several hours, e.g., 3 to 4 hours. The temperature may be up to, e.g., +150° C. but a temperature in the range of 60° to 100° C., preferably 80° to 100° C., is preferred. During reaction the mixture may be agitated, e.g., stirred. In the simplest embodiment the two compounds are refluxed, i.e., boiled, in the aromatic hydrocarbon. Activity is determined to some extent by the time of contact and degree of dilution with hydrocarbon. At elevated temperatures, e.g., 60° to 100° C., a reaction time of at least 4 hours gives good results.

After the modification reaction, the modified titanium trichloride may be washed using, for example, Soxhlet extraction, or suspension decantation using an organic solvent such as a hydrocarbon. This is generally advantageous since it improves the isotacticity and/or yield of the olefin polymer.

The titanium trichloride used is preferably violet titanium trichloride. Violet titanium trichloride prepared by reduction of titanium tetrachloride with aluminium or aluminium alkyl is preferred on the grounds of activity availability and cost. Violet titanium trichloride prepared by reduction of the tetrachloride with hydrogen and brown (beta) titanium trichloride are less active but can still give a useful catalyst. Titanium trichloride cocrystallised with aluminium trichloride, as described above, is particularly effective, especially $3TiCl_3.AlCl_3$. Delta titanium trichloride is very effective.

In the process for the polymerisation of one or more olefins of the present invention, the polymerisation is effected by means of a catalyst composition comprising titanium trichloride modified with phosphorus oxytrichloride as described above in the presence of a cocatalyst comprising an organo aluminium compound, e.g., an aluminium hydrocarbyl or a hydrocarbyl halide. The hydrocarbyl may be, e.g., aluminium trialkyl and the hydrocarbyl halide, e.g., an aluminium alkyl halide. Advantageously a metal hydrocarbyl and a metal hydrocarbyl halide in admixture are used as cocatalyst. Aluminium trialkyls, e.g., $AlEt_3$ and aluminium alkyl halides which have an alkyl:halogen ratio of greater than 1:1, e.g., $AlEt_2Cl$ (wherein Et=ethyl) or a mixture thereof are preferred. In addition to acting as cocatalyst, the organo aluminium compound used acts as a scavenger for impurities in the polymerisation system. Preferably the alkyl groups have 2 to 10 carbon atoms.

Polymerisation is preferably effected in the liquid phase, and preferably in a hydrocarbon diluent which is not polymerisable under the polymerisation conditions used. Examples of suitable diluents are hexane, cyclohexane and petroleum ether. Reaction is preferably carried out in the substantial absence of oxygen, moisture and other compounds which may deactivate the catalyst. Preferably the organo aluminium compound used as cocatalyst is added to the mononer(s) and diluent before the addition of the modified titanium trichloride.

Polymerisation may be carried out at a temperature of, e.g., 20° C. or more, up to, e.g., 90° C. Higher or lower temperatures may be used if desired. Temperatures in the range 50° C. to 90° C. are most effective. The diluent is preferably saturated with one or more of the monomers before contact with the catalyst. The pressure at which the monomer(s) is/are polymerised is conveniently in the range 1 to 50 atmospheres (700 p.s.i.) although higher pressures, e.g., up to 5,000 atmospheres (70,000 p.s.i.) or sub atmospheric pressures, may be used if desired.

The polymerisation process is especially useful for the polymerisation of aliphatic olefins, and especially alpha-olefins having 3 to 10 carbon atoms, alone or with one or more of each other. It is particularly effective for the preparation of polypropylene, especially where the modified titanium trichloride is used with aluminium triethyl and/or aluminium diethyl chloride as cocatalyst. Optionally other compounds such as those described in U.K. Pat. Nos. 1,234,657 and 1,239,589 referred to above may be added to the polymerisation system to modify the reaction, e.g., to increase yield and/or isotactic content. Examples of such modifying compounds are hexamethyl phosphoramide and tri-n-butyl-phosphine.

Titanium trichloride modified as herein described is particularly effective for use as component A of the intimate dispersion used for the polymerisation of olefins by means of the process described in U.K. Pat. No. 1,419,501.

By means of the olefin polymerisation catalyst composition herein described there may be obtained an increased yield of polymer in polymerisation reactions and/or an increase in the percentage of isotactic polymer in the case of the polymerisation of alpha olefins having 3 or more carbon atoms, especially propylene. When the preferred conditions for the modification of titanium trichloride are used, i.e., heating at 80° C. in the hydrocarbon with stirring for several hours, isotacticities as high as 90% or more may be obtained for polypropylene at high yields in terms of grams of polymer per gram of titanium. Further it has been found that the catalyst can be added to the polymerisation system at higher temperatures to obtain granular polymer whereas previously lower temperatures, e.g., 20° C., are generally required using untreated titanium trichloride. A further advantage is that the olefin polymerisation catalyst composition herein described has a much lower sedimentation rate than one prepared from unmodified titanium trichloride.

If desired, controlled amounts of hydrogen, water, an alcohol or other molecular weight modifiers may be used during polymerisation to control the molecular weight (melt index) of the polymer product.

As will be appreciated by those skilled in the art, the extent of activation of the $TiCl_3$ depends on the type of $TiCl_3$, the concentrations and ratios relative to the phosphorus oxytrichloride, the reaction temperature, the reaction time and the reaction conditions. The extent of activation can best be checked by a test polymerisation reaction using various activation conditions, to find the optimum conditions within the various parameters referred to above. It must be understood that the conditions defined above relate to the modification of the titanium trichloride component prior to contact with the organo aluminium cocatalyst. We specifically exclude addition of the phosphorus oxytrichloride to the polymerisation reactor with the components of the Ziegler catalyst.

EXAMPLE 1

13.0 g $TiCl_3$ (Stauffer AA) were stirred with 70 ml dry benzene and 3 ml $POCl_3$ under nitrogen. The mixture was boiled for 3 hours and it was observed that the bulk volume of the $TiCl_3$ roughly doubled. The solid was washed by suspension and decantation using dry benzene.

Using this modified $TiCl_3$ (1 mM) propylene was polymerised using 2 mM $AlEt_2Cl_3$, 2. mM $AlEt_3$ and 1 mM HMPA. Yield of polypropylene was 36 g of 91.3% isotacticity.

EXAMPLES 2 AND 3

In these examples, the general polymerisation procedure for testing catalysts in as follows:

A 700 ml flanged reactor is equipped with sealed gland stirrer, reflux condenser connected to a bubble seal, thermometer well and gas inlet. The reactor is flushed with dry oxygen-free $N_2$, then filled with 500 ml 100°–120° petroleum ether distilled under $N_2$ from butyl lithium.

The solvent is saturated with dry monomer(s), with vigorous stirring and heated to 40° C. The cocatalyst and any other additive is introduced by means of a syringe, then the catalyst component under examination is introduced as a dispersion in hydrocarbon. The reactor contents are heated to the reaction temperature, usually 80° C., with monomer(s) flowing and the temperature is then held constant for 2 hours. The reaction is stopped by adding an alcohol, the reactor contents are removed and mixed with 1 liter of 1:1 methanol-acetone, and the polymer is recovered by filtration. The product is dried and weighed.

In the case of polypropylene, isotacticity is determined by refluxing a sample with heptane in a Soxhlet apparatus.

EXAMPLE 2

10 g portions of $AATiCl_3$ were weighed into ½ pint capped bottles filled with dry oxygen free nitrogen. 50 ml portions of dry benzene were syringed into the bottles followed by $POCl_3$ in amounts corresponding to Ti:P ratios of 4:1 and 6:1. The bottles were heated and agitated for several hours at 80° C. then cooled. The dispersions were tested using the procedure set out above, using 2.2 mM $AlEt_3$; 1.8 mM DEAC; 1.0 mM HMPA and 1 mM of the modified $TiCl_3$.

4:1 gave 48.5 g of 93.8% isotactic polymer
6:1 gave 42.5 g of 93.1% isotactic polymer.

EXAMPLE 3

The same $AATiCl_3$ in benzene, heated and agitated at 80° C., without added $POCl_3$, was tested as above but $POCl_3$ in amounts of ¼ and 1/6 of the $TiCl_3$ were added to the reactor following the other cocatalyst ingredients.

4:1 gave 33 g of 91% isotactic polymer
6:1 gave 32 g of 91.3% isotactic polymer

It can be seen that modification of the titanium trichloride with $POCl_3$ in accordance with the invention (Example 2) gives improved yield and isotacticity compared with simple addition of the $POCl_3$ to the reactor with the other catalyst components (Example 3).

EXAMPLE 4

20 g portions of Stauffer AA $TiCl_3$ were transferred to ½ pint glass bottles under nitrogen. The bottles were capped than 92 ml dry benzene were injected into each. To one of the bottles was also added 1.5 ml $POCl_3$.

The bottles were shaken at 20° C. for half an hour then left overnight. They were then transferred to a bottle rotating machine where they were heated to 80° C. with mixing of the bottle contents. After 4 hours the bottles were removed and allowed to cool.

1 gallon reactors were charged with hexane, purged with nitrogen and slightly pressurised with commercial propylene of 92% purity. 10 mmol diethyl aluminium chloride were added followed by 5 ml portions of the catalyst slurries. The reactors were heated and pressurised with propylene to 85° C. and 105 psig. Reaction was stopped at the end of one hour and the total polymer contents recovered by steam stripping the slurries.

Yields were the same within experimental error at around 280 g but the untreated catalyst gave 89.5% isotactic polymer whereas the treated catalyst gave 96% isotactic polymer.

EXAMPLE 5

A 1 molar slurry of modified $TiCl_3$ was prepared by heating AA grade $TiCl_3$ with phosphorus oxytrichloride in toluene in a molar ratio of $TiCl_3$ to $POCl_3$ of 6:1. The modification was effected in a sealed bottle for 4 hours whilst tumbling the bottle in a water bath at 80° C. The resultant catalyst was tested in the polymerisation of propylene in isooctane solvent at atmospheric pressure and at 60° C. for a polymerisation time of 2 hours using the modified $TiCl_3$ (1 mmol), triethyl aluminium (2.2 mmol), diethyl aluminium chloride (1.8 mmol) and hexamethyl phosphoramide (1.0 mmol). The yield of polypropylene was 44 grams. After refluxing a 3 gram sample in heptane for 8 hours, 93.5% was insoluble.

EXAMPLE 6

Example 5 was repeated except that the components were reacted in xylene. The yield of polypropylene was 41 grams. 94% was insoluble in boiling heptane.

EXAMPLE 7

For comparison, Example 5 was repeated except that the components were reacted in iso octane, an aliphatic hydrocarbon. The yield of polypropylene was 31 grams. 92% was insoluble in boiling heptane.

Comparing Examples 5,6 and 7, it can be seen that a significant improvement in yield of polymer and some improvement in isotacticity (heptane insoluble fraction) is obtained by reaction of titanium trichloride and phosphorus oxytrichloride in an aromatic hydrocarbon.

EXAMPLES 8 TO 16

Example 5 was repeated varying the time and the temperature of the modification reaction, in order to examine the effect of these variations upon the yield and isotacticity of polypropylene. Modification temperatures of 50°, 80° and 95° C. were used and reaction times of 2, 4 and 6 hours as shown, with the results obtained in the table below.

| Example No. | Temperature (°C.) | Time (Hrs.) | Yield (gms) | Heptane insolubles (%) |
|---|---|---|---|---|
| 8 | 50 | 2 | 38 | 92.5 |
| 9 | 50 | 4 | 40 | 92 |
| 10 | 50 | 6 | 39 | 92.5 |
| 11 | 80 | 2 | 43 | 92 |
| 12 | 80 | 4 | 44 | 93 |
| 13 | 80 | 6 | 43 | 93.5 |
| 14 | 95 | 2 | 45 | 93.5 |
| 15 | 95 | 4 | 45 | 92.5 |
| 16 | 95 | 6 | 45 | 92 |

It can be seen that if a lower temperature is employed then a longer reaction time must be used to obtain similar results. Optimum results are obtained at 80° and 95° C. At 95° C. the percentage of polymer insoluble in boiling heptane decreases from a maximum at 2 hours reaction time. At 80° C. 4 hours reaction time gives the optimum balance of yield and isotacticity with a slightly lower yield than at 95° C. Yields using a reaction temperature of 50° C. are noticeably reduced.

What we claim is:

1. A process for modification of the titanium trichloride component of a Ziegler catalyst which comprises heating the titanium trichloride and phosphorus oxytrichloride in aromatic hydrocarbon diluent, the reaction temperature being 60° to 100° C., the reaction being carried out in the absence of the organo-aluminium component.

2. A process according to claim 1 wherein the temperature is 80° to 100° C.

3. A process according to claim 1 wherein the aromatic hydrocarbon is benzene or toluene.

4. A process according to claim 1 wherein the reaction is carried out for 3 to 4 hours.

5. A process according to claim 1 wherein the reaction is carried out for at least four hours.

6. A process according to claim 1 wherein the titanium trichloride used is titanium trichloride-aluminium trichloride complex.

7. A process according to claim 6 wherein the complex is of formula $3TiCl_3.AlCl_3$.

8. A process according to claim 7 wherein the titanium trichloride used is delta titanium trichloride.

9. A process according to claim 1 wherein the atomic ratio of phosphorus to titanium used in the reaction is 0.01 to 0.5:1.

10. A process according to claim 3 wherein the reaction is carried out for 3 to 4 hours.

11. A process according to claim 10 wherein the atomic ratio of phosphorus to titanium used in the reaction is 0.01 to 0.5:1.

12. A process according to claim 3 wherein the reaction is carried out for at least 4 hours.

13. A process for the preparation of an olefin polymerisation catalyst composition which comprises adding (1) an organo-aluminium compound selected from the group consisting of an aluminium trialkyl, an aluminium alkyl halide which has an alkyl to halogen ratio of greater than 1:1 and a mixture thereof to titanium trichloride modified by the process of claim 1.

14. A process according to claim 13 wherein the alkyl groups in the organo aluminium compound have 2 to 10 carbon atoms.

15. A process according to claim 13 wherein the organo-aluminium compound is selected from aluminium triethyl, diethyl aluminium chloride and a mixture thereof.

16. A process comprising polymerising one or more olefins in the presence of an olefin polymerisation catalyst prepared according to claim 13.

17. A process comprising homopolymerising propylene in the presence of an olefin polymerisation catalyst prepared according to claim 13.

18. A process according to claim 16 wherein the polymerisation is carried out in hexane, cyclohexane or petroleum ether.

19. A process according to claim 1 wherein the reaction is carried out for several hours at 80° C.

20. A process for the polymerization of propylene comprising contacting propylene with a Ziegler catalyst prepared by (1) prereacting the titanium trichloride component with phosphorus oxytrichloride in the atomic ratio P to Ti or 0.01:1 to 0.5:1 by heating in benzene or toluene at a temperature of 60° to 100° C. for a period of at least 4 hours in the absence of the organo aluminum component and (2) thereafter adding the organo aluminum component selected from an aluminum alkyl, an aluminum alkyl halide which has an alkyl to halogen ratio of greater than 1:1 and a mixture thereof.

* * * * *